US011919745B2

(12) United States Patent
Weber

(10) Patent No.: US 11,919,745 B2
(45) Date of Patent: Mar. 5, 2024

(54) MOUNTING DEVICE AND METHOD FOR CARRYING OUT AN INSTALLATION PROCESS IN AN ELEVATOR SHAFT OF AN ELEVATOR SYSTEM

(71) Applicant: Inventio AG, Hergiswil (CH)

(72) Inventor: Stefan Weber, Niederwil AG (CH)

(73) Assignee: INVENTIO AG, Hergiswil (CH)

( * ) Notice: Subject to any disclaimer, the term of this patent is extended or adjusted under 35 U.S.C. 154(b) by 331 days.

(21) Appl. No.: 17/593,041

(22) PCT Filed: Mar. 10, 2020

(86) PCT No.: PCT/EP2020/056363
§ 371 (c)(1),
(2) Date: Sep. 7, 2021

(87) PCT Pub. No.: WO2020/193119
PCT Pub. Date: Oct. 1, 2020

(65) Prior Publication Data

US 2022/0185630 A1 Jun. 16, 2022

(30) Foreign Application Priority Data

Mar. 27, 2019 (EP) .................................... 19165417

(51) Int. Cl.
*B66B 17/00* (2006.01)
*B66B 19/00* (2006.01)

(52) U.S. Cl.
CPC .................................... *B66B 19/00* (2013.01)

(58) Field of Classification Search
CPC ..... B66B 19/00; B66B 19/002; B66B 19/005; B66B 19/007; B66B 19/02; B66B 19/04; B66B 20/00
See application file for complete search history.

(56) References Cited

U.S. PATENT DOCUMENTS 5,005,672 A * 4/1991 Nakai .................. H02K 41/025 187/250
8,141,684 B2 * 3/2012 Bjorni ..................... B66B 11/08 187/254
8,291,568 B2 * 10/2012 Barneman ............... B66B 19/00 29/431

(Continued)

FOREIGN PATENT DOCUMENTS

CA 2115720 A1 9/1994
CN 1938212 A 3/2007

(Continued)

*Primary Examiner* — Chi Q Nguyen
(74) *Attorney, Agent, or Firm* — William J. Clemens; Shumaker, Loop & Kendrick, LLP

(57) ABSTRACT

A mounting device and a method for carrying out an installation process in a vertically extending elevator shaft of an elevator system include a carrier component, a mechatronic installation component and a displacement system. The displacement system displaces the carrier component vertically within the elevator shaft. The installation component is held on the carrier component and, at least semi-automatically, performs a mounting step as part of the installation process. The displacement system also displaces the carrier component horizontally in a shift direction within the elevator shaft between adjacent vertical car tracks.

12 Claims, 4 Drawing Sheets

3 CARRIER 38 WINCH

(56) References Cited

U.S. PATENT DOCUMENTS

| | | | | |
|---|---|---|---|---|
| 8,646,224 | B2 | 2/2014 | Wurth | |
| 9,617,121 | B2 * | 4/2017 | Bolme | B66B 19/002 |
| 11,414,303 | B2 * | 8/2022 | Haapaniemi | B66B 19/007 |
| 2001/0007429 | A1 * | 7/2001 | Shih | G06F 1/26 327/74 |
| 2004/0129504 | A1 * | 7/2004 | Kunz | B66B 1/3492 187/394 |
| 2005/0275161 | A1 * | 12/2005 | Fischer | B66B 19/005 271/277 |
| 2012/0291395 | A1 * | 11/2012 | Plathin | B66B 19/02 52/741.1 |
| 2015/0107186 | A1 | 4/2015 | Wilts et al. | |
| 2016/0060078 | A1 | 3/2016 | Mertala | |
| 2016/0152442 | A1 * | 6/2016 | Weber | B66B 19/00 187/359 |
| 2018/0215588 | A1 | 8/2018 | Butler et al. | |
| 2020/0277151 | A1 * | 9/2020 | Hirabayashi | B65H 5/38 |
| 2021/0245998 | A1 * | 8/2021 | Lanz | B66B 19/00 |
| 2021/0291395 | A1 * | 9/2021 | Mayer | B26D 1/02 |

FOREIGN PATENT DOCUMENTS

| | | | |
|---|---|---|---|
| CN | 103827010 | A | 5/2014 |
| WO | 2017016783 | A1 | 2/2017 |
| WO | 2018234351 | A1 | 12/2018 |
| WO | 2019052970 | A1 | 3/2019 |
| WO | 2019068469 | A1 | 4/2019 |

* cited by examiner

MOUNTING DEVICE AND METHOD FOR CARRYING OUT AN INSTALLATION PROCESS IN AN ELEVATOR SHAFT OF AN ELEVATOR SYSTEM

FIELD

The invention relates to a mounting device for carrying out an installation process in an elevator shaft of an elevator system and to a method for carrying out an installation process in an elevator shaft of an elevator system.

BACKGROUND

The installation of an elevator system in a building and in particular the installation to be carried out of components of the elevator system within an elevator shaft can lead to a lot of effort and thus high costs, since a large number of components have to be mounted at different positions within the elevator shaft. For this purpose, for example, holes must be drilled at certain points in shaft walls and so-called tie bolts have to be inserted into the drilled holes.

WO 2019/068469 A1 describes a device by means of which a lifting height of an elevator system can be increased by lifting a drive platform.

WO 2018/234351 A1 describes a system which allows easy access to an elevator shaft for a maintenance technician to carry out maintenance work and/or to evacuate damaged elevator cars.

WO 2017/016783 A1 describes a mounting device for carrying out an installation process in a vertically extending elevator shaft of an elevator system. The mounting device has a carrier component, a mechatronic installation component in the form of an industrial robot, and a displacement system in the form of a combination of a displacement component and a flexible suspension means. The displacement system is designed to displace the carrier component vertically within the elevator shaft. The installation component is held on the carrier component and is designed to at least semi-automatically perform a mounting step as part of the installation process. With the use of such a mounting device, the described installation of components in the elevator shaft can be carried out with less work and expense than a purely manual installation by one or more fitters.

SUMMARY

In contrast, it is in particular an object of the invention to propose a mounting device and a method for carrying out an installation process in an elevator shaft of an elevator system which allow an elevator system to be installed with a particularly low amount of work, time and/or expenditure. According to the invention, this object is achieved by a mounting device having the features described herein.

The embodiments described relate equally to the mounting device and to the method for carrying out an installation process. In other words, features mentioned below for example with reference to the mounting device can also be implemented as method steps, and vice versa.

The mounting device according to the invention for carrying out an installation process in a vertically extending elevator shaft of an elevator system has a carrier component, a mechatronic installation component and a displacement system. The displacement system is designed to displace the carrier component vertically within the elevator shaft. The installation component is held on the carrier component and is designed to at least semi-automatically perform a mounting step as part of the installation process. According to the invention, the displacement system is designed and arranged such that it can also displace the carrier component horizontally in a shift direction within the elevator shaft.

The horizontal displacement can be combined with a vertical displacement or can consist of different sections which at least also include a vertical displacement, so the displacement does not have to be done exclusively horizontally.

The horizontal displacement of the carrier component makes it possible for the installation component, compared with the mounting device according to WO 2017/016783 A1, to carry out mounting steps in a larger working range within the elevator shaft without the need for a comparatively complex and thus labor, time and cost-intensive displacement of the entire mounting device. The possibility of horizontal displacement of the carrier component could also be used to reduce the range of the installation component while the working range of the mounting device remains at least the same. The installation component and the carrier component could then be made smaller, lighter and also more cost-effective compared with a mounting device according to WO 2017/016783 A1. This would also lead to simple and thus inexpensive handling of the installation component and the carrier component.

An elevator system has at least one elevator car by means of which people and/or goods can be transported in the vertical direction in a vertical car track within the elevator shaft. The elevator system can also have more than one vertical car track within the elevator shaft, with at least one elevator car being able to be displaced vertically in each vertical car track. The displacements of the elevator cars in the various vertical car tracks are in particular independent of one another. Such an elevator system is often referred to as a so-called elevator group. In the fully mounted or operationally ready state, the vertical car tracks of the elevator shaft are usually separated from one another by steel girders, which are also referred to as so-called "divider beams." So-called guide rails for guiding the elevator cars and/or counterweights are then fastened to the steel girders, for example.

The carrier component can be designed in different ways. For example, the carrier component may be designed as a simple platform, framework, scaffold, cab, or the like. The dimensions of the carrier component should be selected in such a way that the carrier component can be easily accommodated in the elevator shaft and displaced within this elevator shaft.

The installation component should be mechatronic, i.e. it can have interacting mechanical, electronic and information-technology elements or modules. For example, the installation component should comprise a suitable mechanism in order to handle tools within a mounting step, for example. In this case, the tools can be suitably moved into a mounting position by the mechanism and/or suitably guided during a mounting step.

Electronic elements or modules of the mechatronic installation component may for example be used to suitably actuate or control mechanical elements or modules of the installation component. Such electronic elements or modules can thus serve as a controller for the installation component, for example.

Furthermore, the installation component can have information-technology elements or modules by means of which, for example, it can be derived to which position a tool should be brought and/or how the tool should be operated and/or guided there during a mounting step.

An interaction between the mechanical, electronic and information-technology elements or modules should take place such that at least one mounting step can be carried out semi-automatically or fully automatically by the mounting device as part of the installation process.

The mounting device has in particular a control means which controls the mounting device. For example, it controls actuators of the displacement system, for example a controllable winch or an electric motor. It also evaluates measurement values from sensors of the mounting device and is in communication with electronic elements and modules of the installation component.

Guide components can also be provided on the carrier component, with the aid of which the carrier component can be guided along one or more of the shaft walls of the elevator shaft during a displacement within the elevator shaft. The guide components can be designed, for example, as support rollers that roll on a shaft wall of the elevator shaft. Depending on the arrangement of the support rollers on the carrier component, one to in particular four support rollers can be provided. In order to allow rolling of the carrier component in the elevator shaft both in the case of vertical and horizontal displacement, the support rollers are designed in particular to be pivotable about an axis perpendicular to the relevant shaft wall.

The displacement system has in particular at least one displacement component, for example in the form of a winch or a so-called endless winch. The carrier component is then connected to the at least one displacement component via a flexible suspension means and can be displaced in the elevator shaft by displacing the suspension means. The suspension means can have one or more parallel strands in the form of cables, chains or belts. The at least one displacement component is in particular arranged in a stationary manner above the carrier component so that the carrier component is suspended from the at least one displacement component via the suspension means. It is also possible for the at least one displacement component to be arranged on the carrier component and for an end of the suspension means opposite the displacement component to be fixed above the carrier component. In this case, the carrier component and the at least one displacement component are suspended from the suspension means.

With the exception of the displacement system, the mounting device is designed in accordance with a mounting device according to WO 2017/016783 A1, for example.

In one embodiment of the invention, the displacement system is designed and arranged so that it can displace the carrier component

- vertically in a first vertical car track of the elevator system that extends in the elevator shaft,
- horizontally from the first vertical car track into a second vertical car track of the elevator system that extends in the elevator shaft next to the first vertical car track in the shift direction and
- vertically in the second vertical car track.

In this way, the mounting device can be used to at least semi-automatically perform mounting steps in vertical car tracks that are next to one another without complex conversion work. Installations in an elevator shaft of an elevator group can thus be performed in a very time-saving and cost-effective manner.

The first and the second vertical car tracks do not necessarily have to be arranged directly next to one another, that is to say adjacent to one another. It is possible for one or more further vertical car tracks to be arranged between the first and the second vertical car track.

In one embodiment of the invention, the displacement system has a horizontal shifting means, only one displacement component and a suspension means. The suspension means can be displaced vertically by means of the displacement component, the carrier component is connected to the horizontal shifting means via the suspension means and the displacement component, and the displacement component with the suspension means and the carrier component can be displaced horizontally in the shift direction along the horizontal shifting means.

A horizontal displacement of the carrier component can therefore be implemented simply and thus inexpensively.

The horizontal shifting means has in particular a rail, for example in the form of a double-T beam, which is fixed above the carrier component so as to be aligned horizontally in the displacement direction in the elevator shaft. The suspension means or the displacement component is held on the rail and thus suspended via a coupling means, for example a roller arrangement. The coupling means can be shifted along the rail via a suitable horizontal drive, for example a combination of an electric motor, a toothed belt and corresponding deflection rollers. Together with the coupling means, the displacement component with the suspension means and the carrier component is then also shifted horizontally.

In one embodiment of the invention, the displacement system has a first displacement component with a first suspension means and a second displacement component with a second suspension means. The carrier component is suspended at a first suspension point via the first displacement component and the first suspension means and at a second suspension point via the second displacement component and the second suspension means, the second suspension point being offset in the shift direction with respect to the first suspension point. Thus, by displacing the first suspension means and/or the second suspension means, the carrier component can be displaced vertically and horizontally in the shift direction.

A horizontal displacement of the carrier component can therefore be implemented simply and thus inexpensively.

The above-mentioned suspension points are in particular arranged in a stationary manner with respect to the elevator shaft. A suspension point can be designed, for example, as a hook fixed in a shaft wall of the elevator shaft, as a hook on a platform that is stationary in the elevator shaft, or as a hook on a carrier that is stationary in the elevator shaft. The displacement components are in particular fixed to their respective suspension points. For example, they can be fastened directly to the suspension point or can also be fastened to the suspension point via a piece of suspension means having an in particular constant length. This means that, when the carrier component is displaced, the displacement components do not have to be displaced as well.

For example, the first displacement component is arranged in an upper region of a first vertical car track and the second displacement component is arranged in an upper region of a second vertical car track. If the carrier component is suspended exclusively on the first suspension means, so no significant force acts on the carrier component via the second suspension means, the carrier component is displaced vertically in the first vertical car track when the first suspension means is displaced. If the carrier component is suspended exclusively on the second suspension means, so no significant force acts on the carrier component via the first suspension means, the carrier component is displaced vertically in the second vertical car track when the second suspension means is displaced. If sufficient forces act on the carrier component via both suspension means, the carrier component can also be displaced horizontally. If, for example, the carrier component is initially suspended only on the first suspension means and then the carrier component is pulled via the second suspension means in the direction of the second suspension point, the carrier component is displaced in an arc around the first suspension point in the direction of the second suspension point. The carrier component is thus displaced both vertically and horizontally. By coordinated pulling with the second suspension means and slackening of the first suspension means, the carrier component can also be displaced exclusively horizontally.

The arrangement of the two suspension points with respect to one another, in particular their horizontal distance from one another, thus determines the region in which the carrier component can be horizontally shifted. The suspension points are in particular arranged approximately in the middle of an upper region of two different vertical car tracks. The two vertical car tracks can be arranged directly next to one another or one or more vertical car tracks can also be arranged therebetween. The suspension points are arranged in particular on the outermost vertical car tracks of the elevator shaft, so that the carrier component can be displaced horizontally into all vertical car tracks and vertically in all vertical car tracks.

In one embodiment of the invention, the first suspension point is arranged on a first platform which closes off the first vertical car track at the top. The second suspension point is arranged on a second platform which closes off the second vertical car track at the top. The first platform and the second platform are designed in particular as separate platforms, but it is also possible for them to be designed as a single, common platform.

The platforms serve in particular as protective platforms when the elevator shaft is not closed off at the top, i.e. the building above the platform is still being constructed. In this case, such platforms are necessary anyway to protect against falling objects, and so the suspension points can be arranged on the platforms without great effort.

In addition, in this case, ledges or niches on which the platforms can be easily and safely supported are usually provided in the elevator shaft. For this purpose, the platforms each have in particular at least one, in particular two or four horizontally extendable support beams by means of which the platforms can be supported in the vertical direction at suitable support points in the form of said the ledges or niches. It is also possible for support elements on which the platforms can be supported to be fixed, in particular screwed, to shaft walls of the elevator shaft before the mounting device is introduced into the elevator shaft.

In one embodiment of the invention, the first suspension point is arranged on a first carrier which is supported within the first vertical car track on opposite shaft walls of the elevator shaft. The second suspension point is then arranged on a second carrier which is supported within the second vertical car track on opposite shaft walls of the elevator shaft.

The elongate carriers are arranged in the elevator shaft in particular so as to be oriented obliquely upward. A lower end of the carrier is supported on a threshold of a door opening of the elevator shaft, for example. An upper end leans against a shaft wall opposite the door opening and is thus supported on this shaft wall. The carrier can be designed, for example, like an installation means according to WO 2019/052970 A1 or U.S. Pat. No. 8,646,224 B2.

The above-mentioned object is also achieved with a method for carrying out an installation process in a vertically extending elevator shaft of an elevator system, which method has at least the following steps:

- Introducing a mounting device according to the invention into the elevator shaft;
- Controlled displacement of the carrier component of the mounting device within the elevator shaft; and
- At least semi-automatically performing a mounting step as part of the installation process with the aid of the installation component of the mounting device.

In one embodiment of the invention, the carrier component of the mounting device is introduced into a first vertical car track of the elevator shaft. After being introduced into the elevator shaft, it is displaced vertically in the first vertical car track and it performs the mounting steps to be carried out within the first vertical car track. After completing the mounting steps within the first vertical car track, it is displaced horizontally from the first vertical car track into a second vertical car track of the elevator system that extends next to the first vertical car track in a shift direction. After the displacement has been completed, it is displaced vertically in the second vertical car track and performs the mounting steps to be carried out within the second vertical car track.

This procedure allows the mounting steps required in the elevator shaft to be carried out particularly effectively.

In one embodiment of the invention, after completing the mounting steps within the vertical car tracks of a first vertical section of the elevator shaft, the mounting device is displaced into a second vertical section of the elevator shaft arranged above the first vertical section in order to at least semi-automatically perform further mounting steps there.

The displacement can take place by means of a construction crane, for example, which is already available for the construction of the building having the elevator shaft.

This procedure can advantageously be used when the elevator shaft is so high that the mounting device cannot be moved within the entire elevator shaft. In particular, it can also advantageously be used when the mounting device is already being used in the first vertical section of the elevator shaft when construction is still being carried out above the first vertical section.

It should be noted that some of the possible features and advantages of the invention are described herein with reference to different embodiments of the mounting device according to the invention and the method according to the invention. A person skilled in the art recognizes that the features can be combined, adapted, transferred or exchanged in a suitable manner in order to arrive at further embodiments of the invention.

Further advantages, features and details of the invention will become apparent from the following description of embodiments and from the drawings in which identical or functionally identical elements are denoted with identical reference signs. The drawings are merely schematic and not to scale.

DETAILED DESCRIPTION

Figures 1A, 1B, 1C:
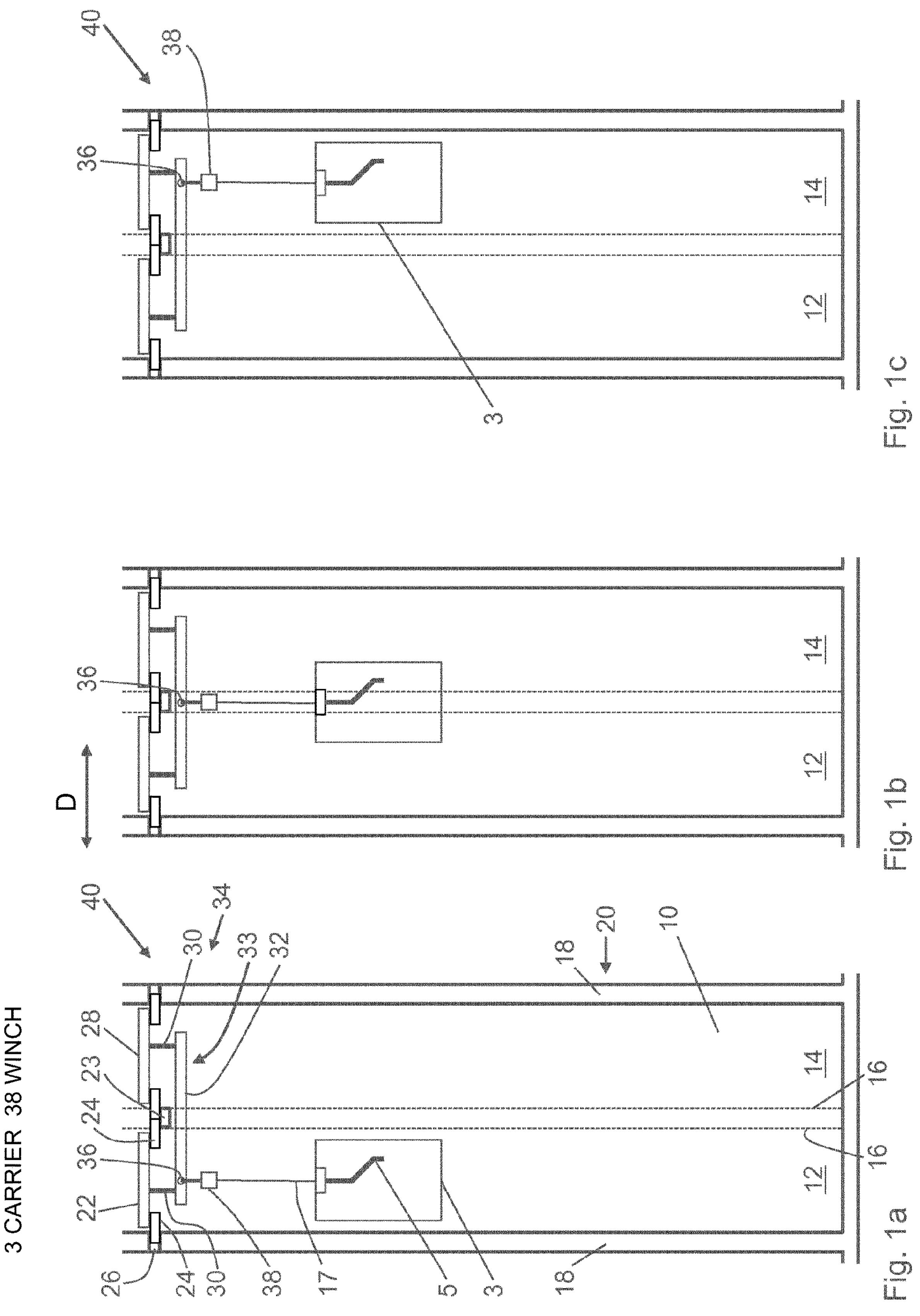
FIG. 1*a* shows a mounting device for carrying out an installation process in an elevator shaft having two vertical car tracks, with a carrier component having an installation component being arranged in a first vertical car track.
FIG. 1*b* shows the mounting device from FIG. 1*a*, with the carrier component having the installation component being arranged between the first and a second vertical car track.
FIG. 1*c* shows the mounting device from FIGS. 1*a* and 1*b*, with the carrier component having the installation component being arranged in the second vertical car track.

According to FIGS. 1*a* to 1*c*, a vertically extending elevator shaft 10 of an elevator system (not shown) has a first vertical car track 12 and a second vertical car track 14 arranged directly next to the first vertical car track 12. The two vertical car tracks 10, 12 are separated from one another by two dashed lines 16 in FIGS. 1*a* to 1*c*. In the fully mounted state of the elevator system, a plurality of steel girders are arranged at a vertical distance between the two lines 16 and separate the two vertical car tracks 12, 14 from one another. Guide rails are then fastened to the steel girders as well as to shaft walls 18 of the elevator shaft 10 opposite the steel girders, along which rails at least one elevator car is guided for each vertical car track 12, 14 during a displacement in the corresponding vertical car track 12, 14.

A first vertical section 20 of the elevator shaft 10 is shown in FIGS. 1*a* to 1*c*. Above the first vertical section 20, the elevator shaft 10 is in particular not yet completely finished, but is still under construction. The first vertical car track 12 is closed off at the top by a first platform 22, which serves as a so-called protective platform. The first platform 22 protects the first vertical car track 12 from parts falling from above. The first platform 22 has a total of four extendable support beams 24 which are arranged at the bottom of the first platform 22 and can be extended horizontally in the direction of the shaft walls 18. In order to introduce the first platform 22 into the elevator shaft 10, the support beams 24 can be retracted inward beneath the first platform 22. The support beams 24 which are oriented in the direction of the shaft wall 18 are partially arranged in a niche 26 in the shaft wall 18 and are thus supported at the bottom. The two other support beams 24 oriented in the direction of the second vertical car track 14 rest on support elements 23 which are fixed in the elevator shaft 10 before the first platform 22 is introduced, and are thus supported at the bottom. The second vertical car track 14 is closed off at the top by a second platform 28 which is designed analogously to the first platform 22 and is supported at the bottom analogously to the first platform 22. It is also possible that the two platforms are designed as a single, common platform.

A rail 32 is held beneath the two platforms 22, 28 by means of two vertically extending holding rods 30. Each holding rod 30 is fixed to one of the platforms 22, 28. The rail 32 is designed as a double-T beam, for example, and extends horizontally. It extends from the first vertical car track 12 into the second vertical car track 14 and thus in a shift direction D. A coupling device in the form of a roller arrangement 36 is guided in the rail 32 and can be shifted on the rail 32 by means of a horizontal drive (not shown) and thus shifted horizontally between the two vertical car tracks 12, 14.

Figure 2:
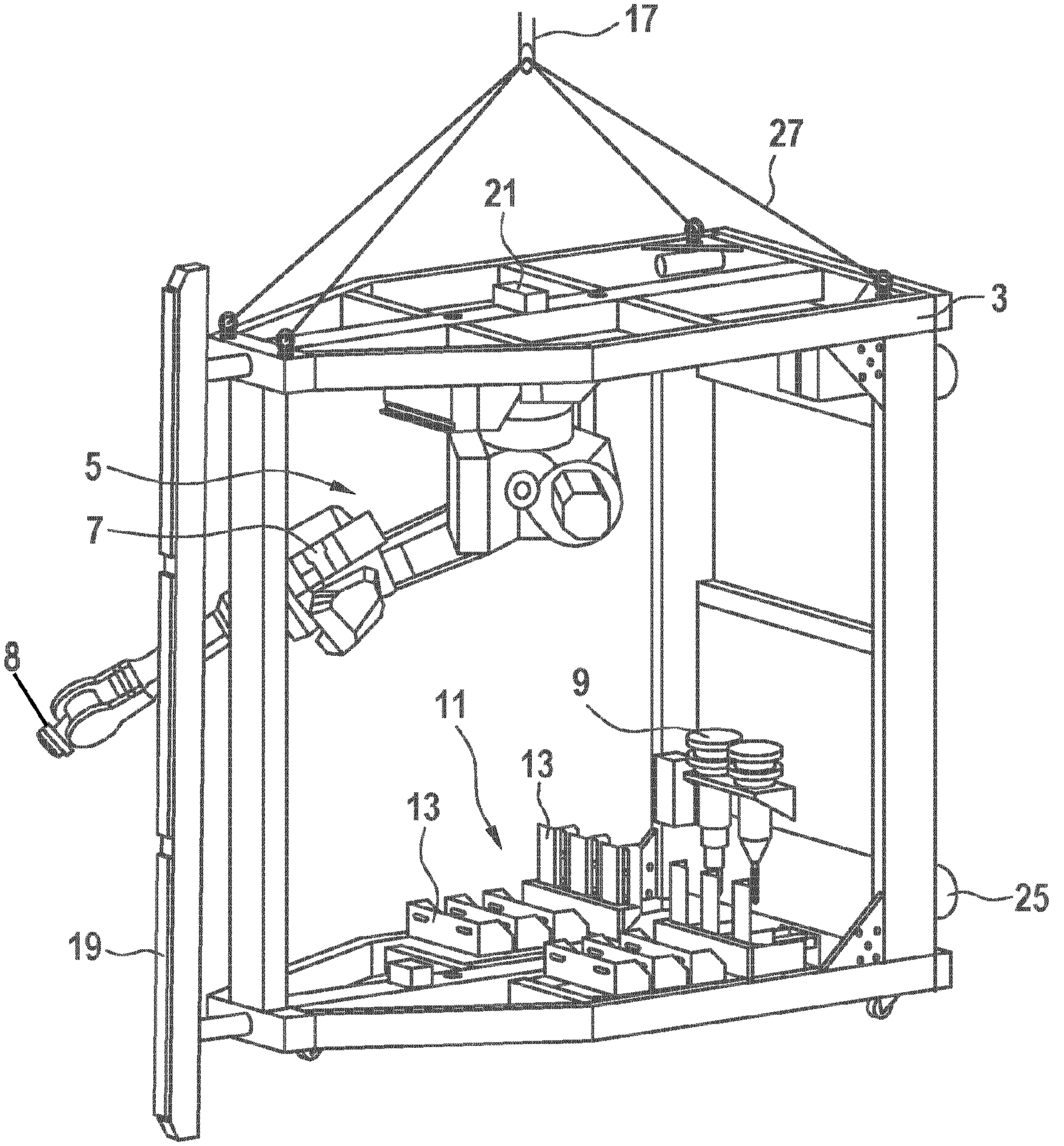
FIG. 2 is an enlarged view of a carrier component having an installation component.

A displacement component 38 in the form of a winch is suspended from the roller arrangement 36. The displacement component 38 can displace a downwardly hanging, flexible suspension means 17 vertically, i.e. pull it up or let it down. A carrier component 3 having a mechatronic installation component 5, which will be discussed in greater detail in connection with FIG. 2, is suspended from the suspension means 17.

The rail 32, the roller arrangement 36 and the horizontal drive (not shown) together form a horizontal shifting means 33. The holding rods 30, the rail 32, the roller arrangement 36, the horizontal drive (not shown), the single displacement component 38 and the suspension means 17 together form a displacement system 34. The platforms 22, 28, the displacement system 34 and the carrier component 3 with all the parts arranged thereon together form a mounting device 40 for carrying out an installation process in a vertically extending elevator shaft of an elevator system.

By means of the displacement component 38 and the suspension means 17, the carrier component 3 can be displaced in the first vertical car track 12, as shown in FIG. 1*a*. It can be fixed at different heights and can at least semi-automatically perform mounting steps as part of an installation process. For example, holes can be drilled in the shaft walls of the elevator shaft 10 and tie bolts can be inserted into the drilled holes. The carrier component 3 and the components arranged thereon are designed in particular as described in WO 2017/016783 A1.

In order to carry out an installation process in the elevator shaft 10, the mounting device 40 is thus first introduced into the elevator shaft 10. In this process, the carrier component 3 is introduced into the first vertical car track 12 as shown in FIG. 1*a*. All of the mounting steps to be performed by the mounting device 40 in the first vertical car track 12 are then performed. For this purpose, the carrier component 3 is displaced vertically to the necessary heights by means of the displacement component 38. After completing the mounting steps within the first vertical car track 12, the carrier component 3 is displaced horizontally into the second vertical car track 14. For this purpose, the roller arrangement 36 is shifted by means of the horizontal drive along the rail 32 in the direction of the second vertical car track 14 and thus in the shift direction D. The displacement component 38, the suspension means 17 and the carrier component 3 with all the components arranged thereon are also shifted or displaced together with the roller arrangement 36 in the direction of the second vertical car track 14.

FIG. 1*b* shows an intermediate position in which the roller arrangement 36 and the parts suspended therefrom are arranged between the first vertical car track 12 and the second vertical car track 14. FIG. 1*c* shows the state after completion of the described horizontal displacement. The carrier component 3 is now arranged in the second vertical car track 14. After the horizontal displacement, all of the mounting steps to be performed by the mounting device 40 in the second vertical car track 14 are performed. For this purpose, the carrier component 3 is again displaced vertically to the necessary heights by means of the displacement component 38.

The elevator shaft can also have more than two vertical car tracks, for example four or six. In this case, the horizontal shifting means is designed such that the carrier component can be displaced horizontally into the two outermost vertical car tracks. The carrier component can thus carry out mounting steps in all vertical car tracks.

FIG. 2 shows the carrier component 3 with the parts arranged thereon in an enlarged and more detailed view compared to FIGS. 1*a* to 1*c*. The carrier component 3 is designed as a cage-like frame in which a plurality of horizontally and vertically extending beams form a mechanically loadable structure. The dimensioning of the beams and any struts provided is designed such that the carrier component 3 can withstand forces that can occur during various mounting steps carried out by the installation component 5 as part of an installation process in the elevator shaft 10.

Retaining cables 27 which can be connected to the suspension means 17 are attached to the top of the cage-like carrier component 3. By displacing the suspension means 17 within the elevator shaft 10, i.e. for example by winding up or unwinding the flexible suspension means 17 onto or from the displacement component 38, the carrier component 3 can thus be moved vertically so as to be suspended within the elevator shaft 10.

Guide components, for example in the form of support rollers 25, can also be provided on the carrier component 3, with the aid of which the carrier component 3 can be guided along one or more of the shaft walls 18 of the elevator shaft 10 during a displacement within the elevator shaft 10. In order to allow rolling of the carrier component 3 in the elevator shaft 10 both in the case of vertical and horizontal displacement, the support rollers 25 are designed to be pivotable about an axis perpendicular to the relevant shaft wall 18.

A fixing component 19 is provided on the side of the carrier component 3. In the example shown, the fixing component 19 is formed with an elongate beam extending in the vertical direction, which beam can be displaced in the horizontal direction with respect to the frame of the carrier component 3. For this purpose, the beam can be attached to the carrier component 3 by means of a lockable hydraulic cylinder or a self-locking motor spindle, for example. When the beam of the fixing component 19 is moved away from the frame of the carrier component 3, it moves laterally toward one of the walls 18 of the elevator shaft 10. Alternatively or additionally, rams could be moved backward on the rear side of the carrier component 3 in order to expand the carrier component 3 in the elevator shaft 10. In this way, the carrier component 3 can be secured within the elevator shaft 10 and the carrier component 3 can thus be fixed within the elevator shaft 10 in the lateral direction while a mounting step is being carried out, for example.

In the embodiment shown, the mechatronic installation component 5 is implemented by means of an industrial robot 7. It should be noted, however, that the mechatronic installation component 5 can also be implemented in other ways, for example with differently designed actuators, manipulators, effectors, etc. In particular, the installation component could have mechatronics or robotics specially adapted for use in an installation process within an elevator shaft 10 of an elevator system.

In the example shown, the industrial robot 7 is equipped with a plurality of robot arms that are pivotable about pivot axes. For example, the industrial robot can have at least six degrees of freedom, i.e. a mounting tool 9 guided by the industrial robot 7 can be moved with six degrees of freedom, i.e. with three rotational degrees of freedom and three translational degrees of freedom, for example. The industrial robot can be designed as a vertical buckling arm robot, a horizontal buckling arm robot, a SCARA robot or a Cartesian robot, or as a portal robot, for example.

The free end 8 of the robot can be coupled to various mounting tools 9. The mounting tools 9 can differ with regard to their design and their intended use. The mounting tools 9 can be held on the carrier component 3 such that the free end 8 of the industrial robot 7 can be brought toward them and coupled to one of them. For this purpose, the industrial robot 7 can have, for example, a tool changing system which is designed such that it allows at least the handling of a plurality of mounting tools 9 of this kind.

One of the mounting tools 9 may be designed as a drilling tool, similar to a drilling machine. By coupling the industrial robot 7 to such a drilling tool, the installation component 5 can be designed to allow holes to be drilled in an at least semi-automatically controlled manner, for example in one of the shaft walls 18 of the elevator shaft 10. In this case, the drilling tool can for example be moved and handled by the industrial robot 7 such that the drilling tool drills holes with a drill bit at a specified position, for example in the concrete of the wall 18 of the elevator shaft 10, into which holes for example fastening screws or tie bolts can be subsequently screwed in order to fix fastening elements.

A further mounting tool 9 may be designed as a screwing device for at least semi-automatically screwing fastening screws into previously drilled holes in a shaft wall 18 of the elevator shaft 10.

Furthermore, a magazine component 11 can be provided on the carrier component 3. The magazine component 11 can be used to store components 13 to be installed and to provide the installation component 5. In the example shown, the magazine component 11 is arranged in a lower region of the frame of the carrier component 3 and houses various components 13, for example in the form of different profiles which are to be mounted within the elevator shaft 10 on shaft walls 18, for example, in order to be able to fasten guide rails for the elevator system thereto. The magazine component 11 can also store and provide screws or tie bolts that can be screwed or inserted into prefabricated holes in the wall 18 by means of the installation component 5.

In order to be able to position the carrier component 3 precisely within the elevator shaft 10, a positioning component 21 can also be provided. The positioning component 21 can, for example, be permanently mounted on the carrier component 3 and can thus be moved along with the carrier component 3 within the elevator shaft 3 when the component is displaced. Alternatively, the positioning component 21 could also be arranged independently of the carrier component 3 at a different position within the elevator shaft 10 and determine a current position of the carrier component 3 from there.

A controller (not shown) of the mounting device can evaluate signals from the positioning component 21 and use these signals to determine an actual positioning relative to a target positioning within the elevator shaft 10. Based on this, the controller can then initially move the carrier component 3 within the elevator shaft 10 to a desired height or allow it to move thereto, for example. Subsequently, taking into account the then determined actual position, the controller can suitably control the installation component 5, for example in order to drill holes at desired locations within the elevator shaft 10, to screw in screws and/or ultimately to mount components 13.

Figures 3A, 3B, 3C:
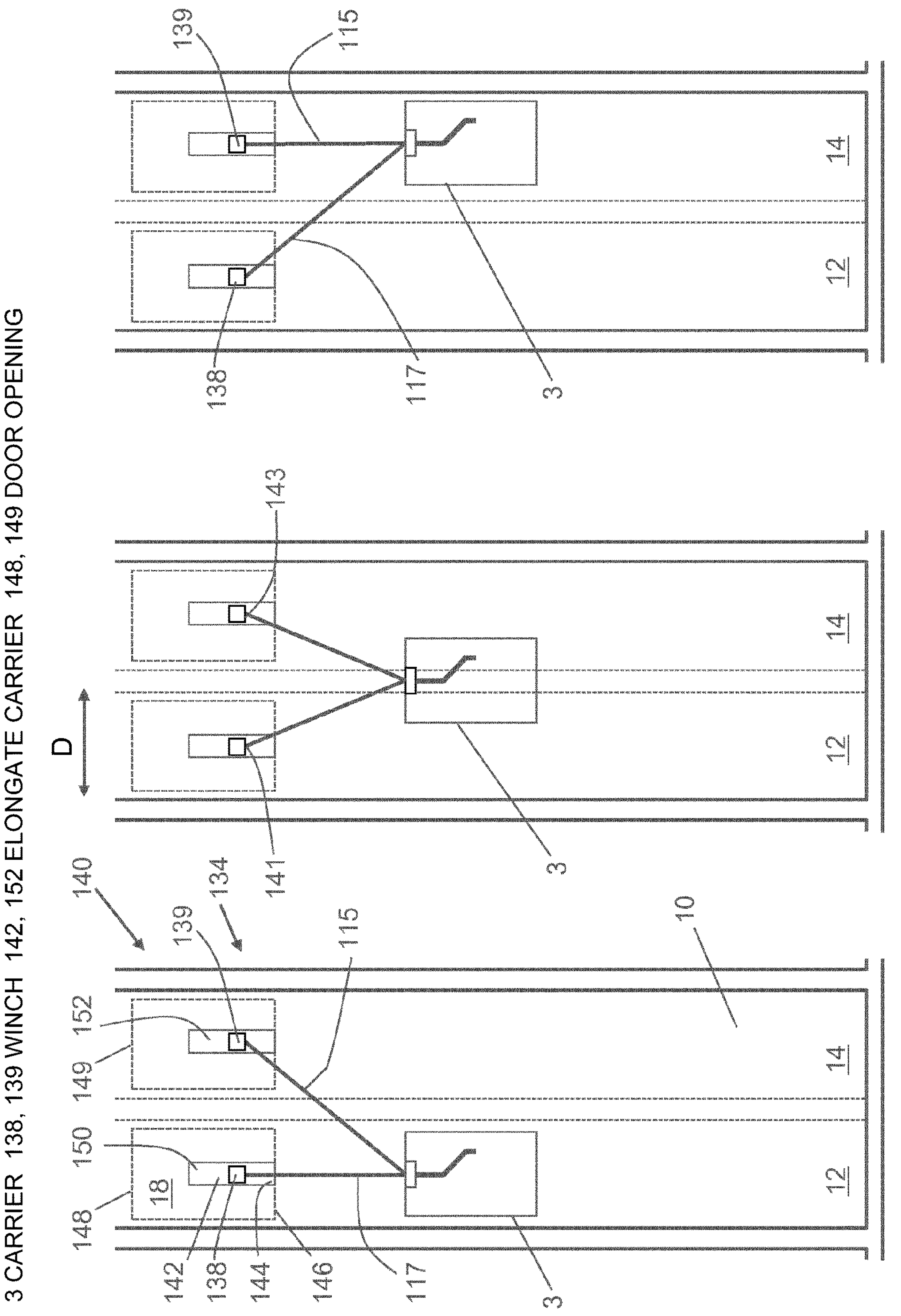
FIG. 3*a* shows a second embodiment of a mounting device for carrying out an installation process in an elevator shaft having two vertical car tracks, with a carrier component having an installation component being arranged in a first vertical car track.
FIG. 3*b* shows the mounting device from FIG. 3*a*, with the carrier component having the installation component being arranged between the first and a second vertical car track.
FIG. 3*c* shows the mounting device from FIGS. 3*a* and 3*b*, with the carrier component having the installation component being arranged in the second vertical car track.

FIGS. 3*a* to 3*c* show a mounting device 140 that is an alternative to the mounting device 40 from FIGS. 1*a* to 1*c*. The elevator shaft 10 and the carrier component 3 with all the parts arranged thereon are unchanged, and so the following mainly deals with the differences in the displacement systems.

The displacement system 134 of the mounting device 140 according to FIGS. 3*a* to 3*c* has a first displacement component 138 in the form of a winch with a first suspension means 117 and a second displacement component 139 in the form of a winch with a second suspension means 115. Both suspension means 115, 117 are connected to the carrier component 3. The carrier component 3 can therefore be suspended on both suspension means 115, 117.

The first displacement component 138 is fixed to a first suspension point 141 of a first elongate carrier 142 which is arranged at the top of the first vertical car track 12 and is supported at its lower end 144 on a threshold 146 of a first door opening 148 of the elevator shaft 10. The threshold 146 can be considered to be part of the shaft wall 18. An upper end 150 of the first carrier 142 leans against a shaft wall 18 opposite the first door opening 148 and is thus supported on this shaft wall 18. The carrier can be designed, for example, like an installation means according to WO 2019/052970 A1 or U.S. Pat. No. 8,646,224 B2. The second displacement component 139 is arranged in the second vertical car track 14 at a second suspension point 143 of a second elongate carrier 152. The second carrier 152 is constructed identically to the first carrier 142 and is arranged analogously thereto between a second door opening 149 and the opposite shaft wall 18. The second suspension point 143 is thus offset in the shift direction D with respect to the first suspension point 141.

In the state shown in FIG. 3*a*, the carrier component 3 is suspended exclusively on the first suspension means 117; the second suspension means 115 does not exert any significant force on the carrier component 3. The carrier component 3 can thus be displaced vertically in the first vertical car track 12 of the elevator shaft 10 by displacing the first suspension means 117. If the carrier component 3 is to be displaced further downward from the position shown in FIG. 3*a*, the second suspension means 115 simply has to be slackened accordingly, that is to say unwound from the second displacement component 139. In this way, as described in connection with FIG. 1*a*, the necessary mounting steps can be performed in the first vertical car track 12.

After completing the mounting steps in the first vertical car track 12, the carrier component 3 is also displaced horizontally into the second vertical car track 14. For this purpose, it is pulled in the direction of the second vertical car track 14 by means of the second suspension means 115. If the first suspension means 117 is neither shortened nor lengthened, the carrier component 3 moves in an arc around the first displacement component 138. The first displacement component 138 can also be controlled in such a way that it shortens the first suspension means 117 to match the shortening of the second suspension means 115 so as to result in only a horizontal displacement of the carrier component 3.

A corresponding intermediate position of the carrier component 3 between the two vertical car tracks 12, 14 is shown in FIG. 3*b*. The horizontal displacement is ended when the carrier component 3 is arranged vertically below the second displacement component 139. This state is shown in FIG. 3*c*. The carrier component 3 is then suspended exclusively on the second suspension means 115; the first suspension means 117 does not exert any significant force on the carrier component 3. The carrier component 3 can thus be displaced vertically in the second vertical car track 14 of the elevator shaft 10 by displacing the second suspension means 115. In this way, as described in connection with FIG. 1*c*, the necessary mounting steps can be performed in the second vertical car track 14.

The displacement components 138, 139 and the suspension means 115, 117 thus together form a displacement system 134 which can displace the carrier component 3 both vertically within the two vertical car tracks 12, 14, and thus within the elevator shaft 10, and horizontally in the shift direction D, i.e. between the two vertical car tracks 12, 14.

Figure 4A:
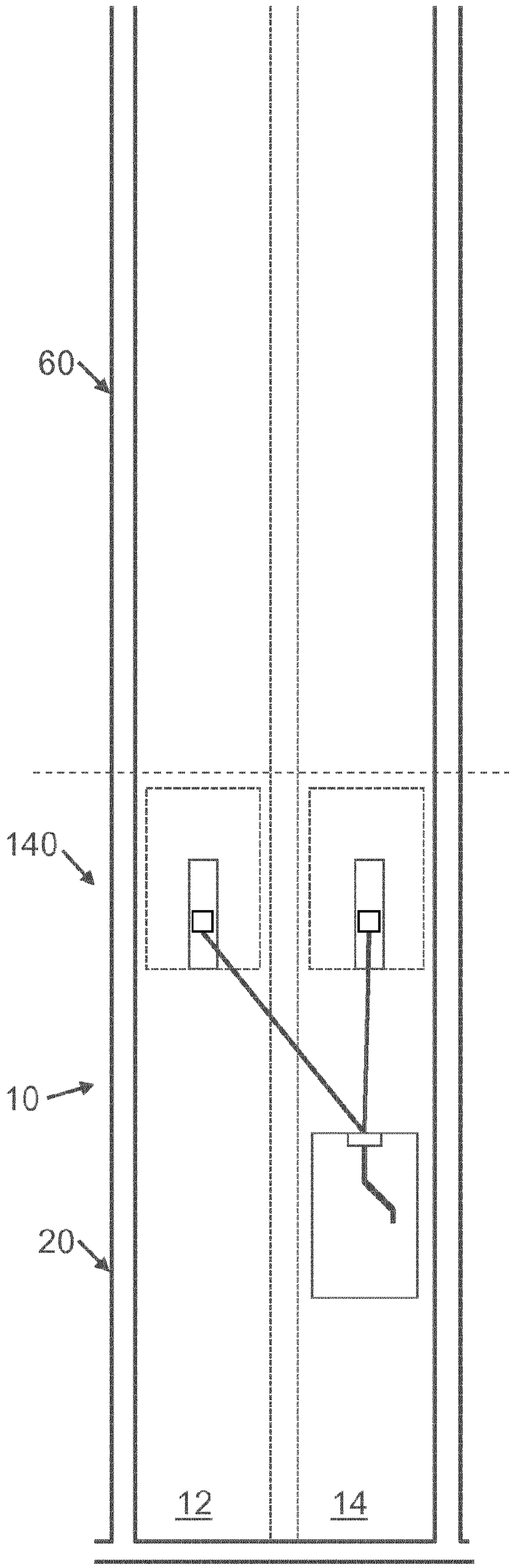
FIG. 4*a* shows a mounting device for carrying out an installation process in a first vertical section of an elevator shaft having two vertical car tracks and FIG. 4*b* shows a mounting device from FIG. 4*a* after being displaced into a second vertical section of the elevator shaft arranged above the first vertical section.
Figure 4B:
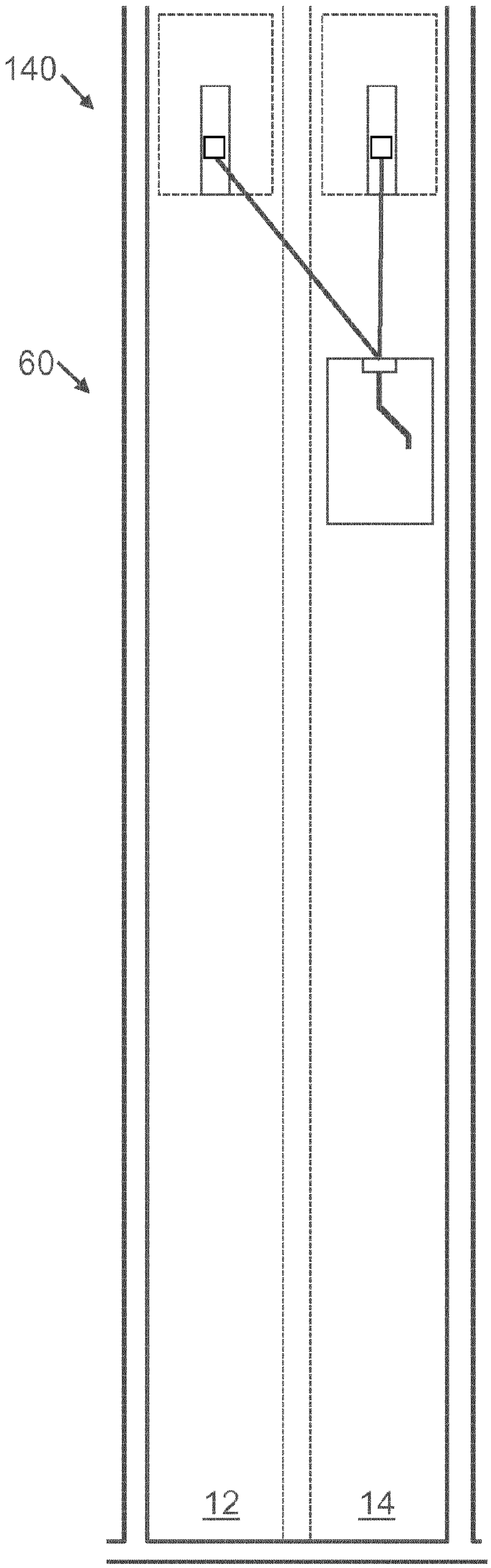

FIG. 4*a* shows a state in which all the mounting steps to be carried out in the vertical car tracks 12, 14 of the first vertical section 20 of the elevator shaft 10 have been completed. The mounting is now to be continued in a second vertical section 60 of the elevator shaft 10 which is arranged above the first vertical section 20 and is constructed identically. For this purpose, the entire mounting device 140 is displaced from the first vertical section 20 into the second vertical section 60 with the aid of a construction crane (not shown). After the displacement has been completed, mounting steps can be performed in the two vertical car tracks 12, 14 of the second vertical section 60 in an analogous manner. In particular, a start is made in the second vertical car track 14 and the mounting is then continued in the first vertical car track 12.

Analogously thereto, the mounting device 40 can also be displaced from a first vertical section into a second vertical section of the elevator shaft which is arranged above the first vertical section.

It is of course possible that a horizontal shifting means 33 according to FIGS. 1*a* to 1*c* can also be held by carriers 142, 152 according to FIGS. 3*a* to 3*c* and that the displacement components 138, 139 according to FIGS. 3*a* to 3*c* can also be fixed on platforms 22, 28 according to FIGS. 1*a* to 1*c*.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A mounting device for carrying out an installation process in a vertically extending elevator shaft of an elevator system, the mounting device comprising:
   - a carrier component;
   - a mechatronic installation component held on the carrier component;
   - a displacement system connected to the carrier component wherein the displacement system is adapted to displace the carrier component vertically within the elevator shaft;
   - wherein the mechatronic installation component is adapted to at least semi-automatically perform at least one mounting step in the elevator shaft as a part of the installation process;

wherein the displacement system is adapted to displace the carrier component horizontally in a shift direction within the elevator shaft; and wherein the displacement system displaces the carrier component vertically in a first vertical car track that extends in the elevator shaft, horizontally in the shift direction from the first vertical car track into a second vertical car track that extends in the elevator shaft next to the first vertical car track, and vertically in the second vertical car track.

2. The mounting device according to claim 1 wherein the displacement system includes a horizontal shifting means, a displacement component and a suspension means, wherein the suspension means is displaced vertically by the displacement component, wherein the carrier component is connected to the shifting means by the suspension means and the displacement component, and wherein the displacement component with the suspension means and the carrier component is adapted to displace horizontally in the shift direction along the shifting means.

3. The mounting device according to claim 1 wherein the displacement system has a first displacement component with a first suspension means and a second displacement component with a second suspension means, wherein the carrier component is suspended at a first suspension point in the elevator shaft by the first displacement component and the first suspension means and is suspended at a second suspension point in the elevator shaft by the second displacement component and the second suspension means, wherein the second suspension point is offset in the shift direction with respect to the first suspension point, and displacing at least one of the first suspension means and the second suspension, means displaces the carrier component vertically and horizontally in the shift direction.

4. The mounting device according to claim 3 wherein the first displacement component is fixed to the first suspension point and the second displacement component is fixed to the second suspension point.

5. The mounting device according to claim 3 wherein the first suspension point is arranged on a first platform that closes off the first vertical car track at a top thereof and the second suspension point is arranged on a second platform that closes off the second vertical car track at a top thereof.

6. The mounting device according to claim 5 wherein the first and second platforms each have at least one horizontally extendable support beam supporting the first and second platforms in a vertical direction at suitable support points in the elevator shaft by the support beams being extended.

7. The mounting device according to claim 3 wherein the first suspension point is arranged on a first carrier supported within the first vertical car track on opposite shaft walls of the elevator shaft, and the second suspension point is arranged on a second carrier supported within the second vertical car track on the opposite shaft walls of the elevator shaft.

8. A method for carrying out an installation process in a vertically extending elevator shaft of an elevator system, the method comprising the following steps:

introducing a mounting device according to claim 1 into the elevator shaft;

controlling displacement of the carrier component of the mounting device within the elevator shaft; and at least semi-automatically performing at least one mounting step as part of the installation process with the mechatronic installation component of the mounting device.

9. The method according to claim 8 including the steps of:

Introducing the carrier component of the mounting device into a first vertical car track of the elevator shaft;

displacing the carrier component vertically in the first vertical car track and performing mounting steps to be carried out within the first vertical car track according to the installation process;

displacing the carrier component horizontally from the first vertical car track into a second vertical car track of the elevator system, the second vertical car track extending next to the first vertical car track in a shift direction; and displacing the carrier component vertically in the second vertical car track and performing mounting steps to be carried out within the second vertical car track according to the installation process.

10. The method according to claim 8 including after the carrier component completes the at least one mounting step within a first vertical section of the elevator shaft, displacing the mounting device into a second vertical section of the elevator shaft arranged above the first vertical section and at least semi-automatically performing at least another mounting step according to the installation process.

11. A mounting device for carrying out an installation process in a vertically extending elevator shaft of an elevator system, the mounting device comprising:

a carrier component;

a mechatronic installation component held on the carrier component;

a displacement system connected to the carrier component wherein the displacement system is adapted to displace the carrier component vertically within the elevator shaft;

wherein the mechatronic installation component is adapted to at least semi-automatically perform at least one mounting step in the elevator shaft as a part of the installation process;

wherein the displacement system is adapted to displace the carrier component horizontally in a shift direction within the elevator shaft; and wherein the displacement system includes a horizontal shifting means, a displacement component and a suspension means, wherein the suspension means is displaced vertically by the displacement component, wherein the carrier component is connected to the shifting means by the suspension means and the displacement component, and wherein the displacement component with the suspension means and the carrier component is adapted to displace horizontally in the shift direction along the shifting means.

12. A mounting device for carrying out an installation process in a vertically extending elevator shaft of an elevator system, the mounting device comprising:

a carrier component;

a mechatronic installation component held on the carrier component;

a displacement system connected to the carrier component wherein the displacement system is adapted to displace the carrier component vertically within the elevator shaft;

wherein the mechatronic installation component is adapted to at least semi-automatically perform at least one mounting step in the elevator shaft as a part of the installation process;

wherein the displacement system is adapted to displace the carrier component horizontally in a shift direction within the elevator shaft; and wherein the displacement system has a first displacement component with a first suspension means and a second displacement component with a second suspension means, wherein the carrier component is suspended at a first suspension point in the elevator shaft by the first displacement component and the first suspension means and is suspended at a second suspension point in the elevator shaft by the second displacement component and the second suspension means, wherein the second suspension point is offset in the shift direction with respect to the first suspension point, and displacing at least one of the first suspension means and the second suspension means displaces the carrier component vertically and horizontally in the shift direction.

* * * * *